United States Patent
Pan

(10) Patent No.: US 8,156,046 B2
(45) Date of Patent: Apr. 10, 2012

(54) METHODS OF RENDERING RECOMMENDED MEDIA ASSETS TO A USER BY EMPLOYING A HANDHELD MEDIA PLAYER

(76) Inventor: Yang Pan, Shanghai (CN)

(*) Notice: Subject to any disclaimer, the term of this patent is extended or adjusted under 35 U.S.C. 154(b) by 135 days.

(21) Appl. No.: 12/202,228

(22) Filed: Aug. 30, 2008

(65) Prior Publication Data

US 2010/0057779 A1 Mar. 4, 2010

(51) Int. Cl.
*G06Q 40/00* (2006.01)
(52) U.S. Cl. .......................... 705/40; 705/30
(58) Field of Classification Search ............... 705/10–44
See application file for complete search history.

(56) References Cited

U.S. PATENT DOCUMENTS

| | | | |
|---|---|---|---|
| 5,913,040 A | 6/1999 | Rakavy et al. | |
| 6,233,682 B1* | 5/2001 | Fritsch | 713/168 |
| 6,317,789 B1 | 11/2001 | Rakavy et al. | |
| 6,363,419 B1 | 3/2002 | Martin, Jr. et al. | |
| 6,539,429 B2 | 3/2003 | Rakavy et al. | |
| 6,928,433 B2 | 8/2005 | Goodman et al. | |
| 7,228,327 B2* | 6/2007 | Shuster | 709/203 |
| 7,369,864 B2 | 5/2008 | Vaananen | |
| 2002/0059370 A1* | 5/2002 | Shuster | 709/203 |
| 2003/0033214 A1* | 2/2003 | Mikkelsen et al. | 705/26 |
| 2004/0055446 A1 | 3/2004 | Robbin et al. | |
| 2004/0077340 A1 | 4/2004 | Forsyth | |
| 2004/0086120 A1* | 5/2004 | Akins et al. | 380/240 |
| 2004/0225519 A1* | 11/2004 | Martin | 705/1 |
| 2006/0156256 A1 | 7/2006 | Lee | |
| 2007/0014536 A1* | 1/2007 | Hellman | 386/94 |
| 2007/0198344 A1* | 8/2007 | Collison et al. | 705/14 |
| 2007/0226260 A1* | 9/2007 | Williams et al. | 707/104.1 |
| 2007/0294064 A1* | 12/2007 | Shuster | 703/3 |
| 2008/0195661 A1* | 8/2008 | Watson et al. | 707/104.1 |
| 2008/0250458 A1* | 10/2008 | Roman | 725/61 |

* cited by examiner

Primary Examiner — Frantzy Poinvil

(57) ABSTRACT

Methods of rendering of unpaid media assets from an on-line merchandiser to a user are disclosed by the use of handheld media players. One embodiment uses the idle screen to display metadata of an unpaid asset when another paid asset is being played. Another embodiment employs the switching-on screen of the player. Recommended unpaid assets by the merchandiser are delivered and stored in the unused storage capacity of the player. The unpaid assets are invisible to the user except that when they are selected by the processor and are displayed on the mentioned screens. The unpaid assets are organized in a single structure as those media assets owned by the user. The capacity occupied by the unpaid media assets is adjusted dynamically based upon the required capacity by the user at a specific time. The media assets stored are managed based on their assigned priorities. The user can pay the on-line merchandiser after the recommended asset is selected through a method that the assigned credits to the user are deducted and the user pays for the on-line merchandiser when next time he or she is connected to the merchandiser through a general purpose computing device.

11 Claims, 12 Drawing Sheets

| file data | album | name | genre | type | visibility | priority |
|---|---|---|---|---|---|---|

Fig.3

METHODS OF RENDERING RECOMMENDED MEDIA ASSETS TO A USER BY EMPLOYING A HANDHELD MEDIA PLAYER

CROSS-REFERENCE TO RELATED APPLICATIONS

This application is related to the U.S. patent application Ser. No. 12/175,455 submitted on Jul. 18th, 2008 by Yang Pan.

BACKGROUND

1. Field of Invention

This invention relates generally to advertising. More specifically, the invention describes methods of rendering recommended media assets from an on-line merchandiser to a user by employing a handheld media player.

2. Description of Prior Art

A handheld media player stores media assets such as songs and video clips, which can be played on the device. Examples of media players are the iPod from Apple Inc. of Cupertino, Calif., the Zen from Creative Technology Ltd, Singapore and the Zune from Microsoft Inc of Redmond, Wash. The handheld media players have gained popularity because of its capability to store large number of media assets in a device, which can be put into a user's pocket when he or she travels.

In order to achieve portability, many handheld media players use minimalist displays that allow the user access to the media assets via simple graphical user interfaces. The large number of media assets are organized in a way of automatic hierarchical categorization by metadata as disclosed in a U.S. Pat. No. 6,928,433 to Goodman and Egan (2005). Robbin et al further disclosed a hierarchically ordered graphical user interface in US patent application 2004/0055446. A user, guided progressively by a user interface from the higher order to the lower order, can select a desired media asset.

A media player acquires typically its media assets from a computer with media management applications, such as the iTunes software, which is a product from Apple Inc. In prior art, the handheld media players are stored with the media assets transferred from a computer. The management of media database, including selection and purchasing of media assets from an on-line merchandiser, is performed with the use of the computer connected to the Internet. The on-line merchandisers have developed methods, such as iTunes from Apple Inc, to display, on a computer display screen, recommended media assets to a user while the user is performing a task related to a specific media item. The recommended media assets are related closely to the item. For example, they may be other albums from the same artist.

A user typically spends more time with handheld media players than with computers for multimedia entertainment experiences. It is desirable that the recommended media assets from an on-line merchandiser are stored in the handheld media players rather than in much less portable computers. Further, the assets should be delivered to the user in an acceptable manner, which does not disrupt the user's experience of using the device for enjoying a media asset.

On the other hand, idle screens of mobile devices have been proposed to render advertisement messages to users of the devices. U.S. Pat. Nos. 5,913,040, 6,317,789, 6,539,429 to Rakavy et al disclosed prior arts to utilize an idle screen of a mobile device to display advertisement messages, which are delivered to the user's device without user's notification. The messages are displayed preferably as a screen saver. U.S. Pat. No. 6,363,419 to Martin et al disclosed a method to display useful or commercial information on an idle screen. The idle content screen is switched to a default display screen when a user's input action is received. The default display screen is the gateway for the user to navigate to various application menus of the mobile device. US patent application 2004/0077340 by Forsyth and the application 2006/0156256 by Lee disclosed similar arts to use idle screens for displaying commercial information with the user's programmability on the displayed contents. In U.S. Pat. No. 7,369,864 to Vaananen, an art is disclosed by using of electronic short messaging method to deliver advertisement messages. The user is shown the message automatically, and he or she may delete it or receive further information on it with one single press of a dedicated key.

The prior arts disclosed previously for rendering advertisement messages are targeted for mobile communication devices, wherein the devices are connected to a communication network while in idle status. Handheld media players are mostly without an integrated communication device. Further, media assets consume significant amount of storage capacity in comparison to typical advertisement messages. A user may not prefer the storage capacity in his or her personal device is used to help a merchandiser to sell a commercial media asset.

Accordingly, it is a purpose of the present invention to provide a method to render recommended media assets to a user by employing an idle screen of a media player while an asset that the user owns the right is being played. The recommended asset may be closely related to the asset being played to attract the user's attention.

It is yet another purpose of the present invention to provide a method to render to a user the recommended media assets, which are stored in the unused storage capacity of the player. The unused storage capacity for storing the recommended assets is adjusted dynamically in accordance with the required capacity by the user. The operation is transparent to the user.

SUMMARY OF THE INVENTION

The invention described herein pertains to a method that recommended media assets are pushed to a user's handheld media player for a revenue generating objective for an on-line merchandiser. An idled display screen or a switching-on screen is employed to display metadata of a recommended asset when a paid asset is being played. The recommended assets are stored in the unused space of the storage system. A song is used as an exemplary media asset in our description of the present invention, which should not limit the scope of the invention.

In one aspect of the invention, each media asset is associated with a metadata of the asset. The metadata is descriptive for the file and includes a format with multiple fields for holding data indicating the name of the album the track is from, the name of the asset, the genre of the asset and the type of track. There are two added fields in the present invention in comparison to conventional ones. One of them indicates the type of asset that can be taken as "normal" or "hidden" asset. Another indicates the priority of the asset with regard to the use of the storage capacity.

For media assets that a user owns, they have a field indicator as "visible" and may be presented to a user in a conventional way as implemented in an iPod from Apple Inc. For media assets pushed by an on-line merchandiser to the user's media player, they have a field indicator as "hidden" and are organized similarly as those assets owned by the user. However, the playlists of the hidden assets are invisible to a user with a conventional operation of the media player.

To effectively utilize the storage system of a handheld media player, the storage system can be divided into three zones. Zone-user is used to store media assets or any other data files owned by the user. Zone-buffer is a buffered storage capacity and zone-hidden is used to store recommended media assets from an on-line merchandiser. Zone-user has the higher priority than zone-hidden whenever there is a competing requirement on the storage capacity. The size of zone-user is decided by the stored media assets own by the user. The size of zone-buffer is decided by a system designer to provide a buffered storage capacity between zone-user and zone-hidden. As long as the storage size of zone-user and zone-buffer is known, the remaining part of the storage capacity can be identified and be used to store the hidden media assets. The storage capacity of zone-hidden changes as the media assets stored in zone-user varies. All media assets have a field indicator indicating their priorities. When it is necessary that the zone-hidden capacity is reduced to give a room to the zone-user, the hidden assets stored are removed sequentially according to their priorities. The lower priority files are removed first. The processor in the media player has a software module to manage different zones of the storage system. The use of zone-hidden becomes invisible to the user because the storage capacity in the player is always available to the user whenever it is required.

According to one aspect of the present invention, the recommended media assets are transferred to the media player when the player is hooked up to a computer that is connected to an on-line merchandiser. The available capacity of the storage space for recommended assets is determined based upon the required capacity from the user and the buffered capacity required by the system. The media assets that fit a user's personal interests are selected by the on-line merchandiser based upon a media asset database of the user. According to one aspect the present invention, the recommended media assets can be selected based upon the user's list of the most played artists. The other albums from the same group of the artists are selected and pushed to zone-hidden of the media player. The priority of each asset can be decided by the ranking of the most played artists from the recorded media interaction history by the user, which is stored in the handheld media player. The storage capacity taken by the recommended media assets must be equal or less than the capacity of the zone-hidden of the storage system.

According to one embodiment of the present invention, when a user selects a paid media asset for playing, the display screen becomes idling after a predetermined period of time. It typically displays the time of the day or such similar information. The present invention proposes to use such an idle screen to display metadata as well as other introductory information about a recommended asset which is in the form of a hidden asset to the user in the conventional sense. The unpaid asset may be in a close relationship to the paid asset being played. The user may choose to play this asset after viewing the displayed metadata and other advertising message or to ignore the message.

According to another embodiment of the present invention, when a user switches on the media player, an advertising message including metadata of a recommended asset may be displayed. The user may proceed with ignorance of the message or the user may select the asset for playing.

A user as a customer of an on-line merchandiser may have a credit limit associated with media asset purchasing. When a recommended asset is selected by a user, one can pay the merchandiser by deducting from the user's existing credits, which are assigned by the merchandiser. The user can pay the on-line merchandiser next time when the media player is hooked up with a computer connected to the merchandiser through the interne. One will get the credit replenished after the on-line payment for the previously selected media assets. In an alternative way, a user can pay the on-line merchandiser directly if the media player is connected to the Internet wirelessly.

BRIEF DESCRIPTION OF THE DRAWINGS

For a more complete understanding of the present invention and its various embodiments, and the advantages thereof, reference is now made to the following description taken in conjunction with the accompanying drawings.

FIG. 3 is a diagram of a file format for storing filed data and file attributes with added fields for the visibility and the priority to identify a hidden file and its priority to use the storage capacity.

DETAILED DESCRIPTION

References will now be made in detail to a few embodiments of the invention, examples of which are illustrated in the accompanying drawings. While the invention will be described in conjunction with the particular embodiments, it will be understood that it is not intended to limit the invention to the described embodiments. To the contrary, it is intended to cover alternatives, modifications, and equivalents as may be included within the spirit and scope of invention as defined by the appended claims.

The term "media player" used in this disclosure generally refers to computing devices that are dedicated to processing media. In one implementation, the media player is a handheld computing device. These computing devices are generally portable so as to allow a user to listen to music wherever the user travels. The media player is a handheld device that is sized for placement into a pocket of the user. By being pocket sized, the user does not have to directly carry the device and therefore the device can be taken almost anywhere the user travels. It should be noted that a media player may be a part of a handheld computing and communication device.

The media player typically has connection capabilities that allow a user to upload and download data to and from a host device such as a computer. With regard to music player, songs and playlists stored on the computer may be downloaded into the music player. In our description of the invention, a music player is taken as an exemplary case for the purpose of the illustration but not limit the scope of the invention.

Figure 1:
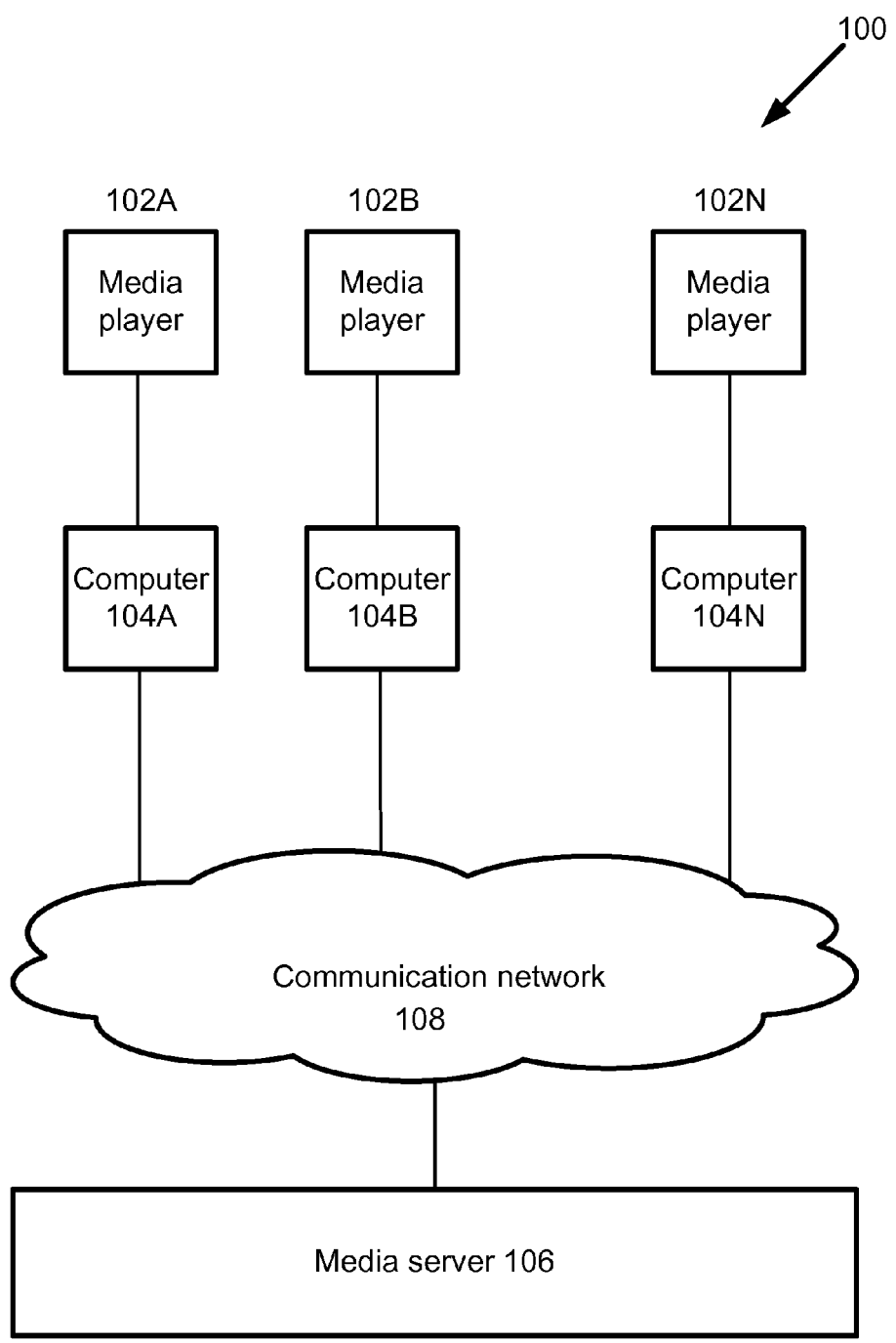
FIG. 1 is a schematic diagram of a server used by an on-line merchandiser to deliver media assets to a plurality of handheld media players through a plurality of computers, which are connected to the server through a communication network.

FIG. 1 is a schematic diagram of an exemplary media distribution system 100 for distributing media assets. The media players 102A, 102B, and 102N are handheld devices carried by users. The media players 102A, 102B and 102N are connectable to computers 104A, 104B and 104N, respectively. The media database between a media player and a computer can be synchronized when they are connected. Media server 106 is used by an on-line merchandiser to distribute media assets. In various embodiments, each computer may communicate with a media server 106 through a communication network 108. The communication network can take various forms such as the Internet, a W-LAN and other suitable communication networks. It should be noted that system depicted in FIG. 1 shows a single media server 106 for ease of illustration purpose only. Various embodiments may use multiple servers in a manner that is either apparent or transparent to the communication system and its users.

Figure 2:
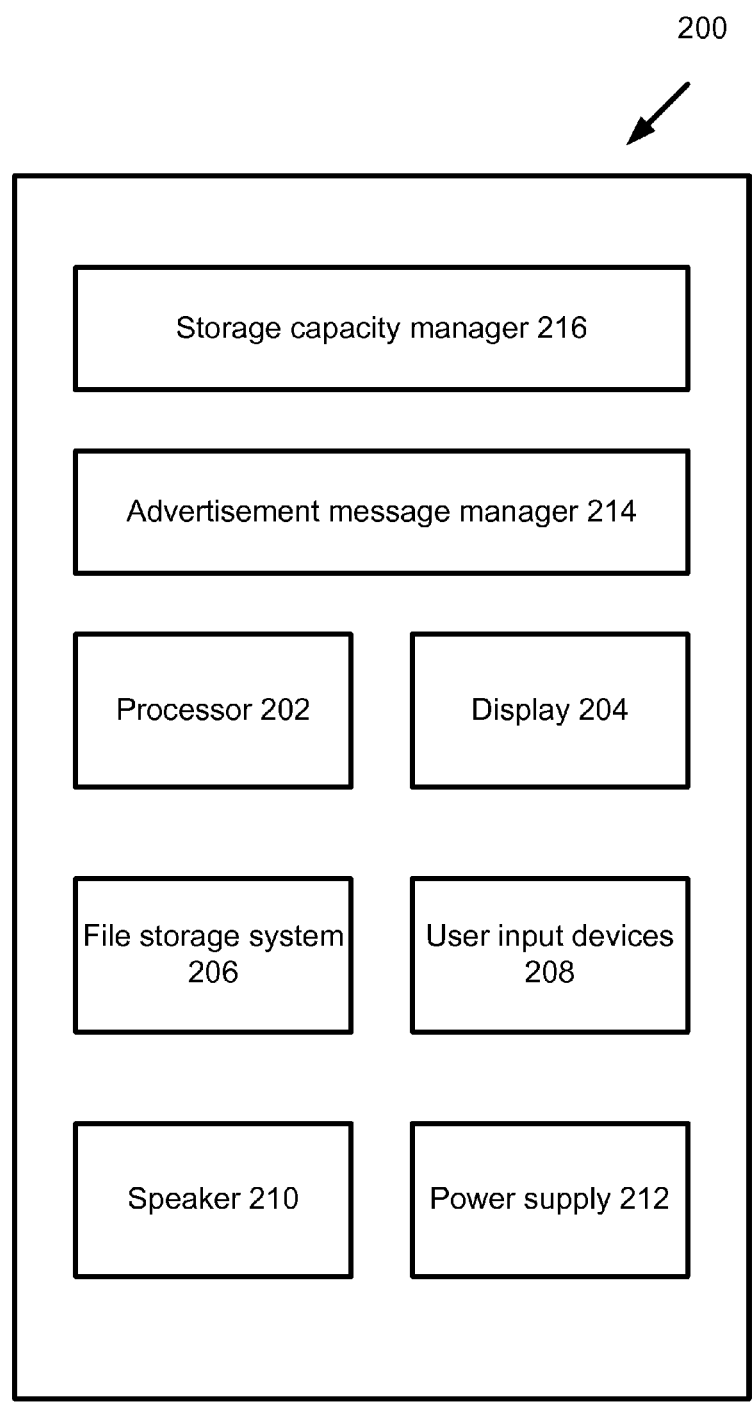
FIG. 2 is a schematic diagram of a handheld media player, an "advertisement message manager" (software module) and a "storage capacity manager" (software module) are used to control the operations of rendering advertisement messages to the user.

We take a handheld music player as an exemplary case to illustrate the present invention. It should be noted that the invention can be applied to any other mobile electronic device such as a mobile phone with an integrated MP3 player for these familiar with the art. As shown in FIG. 2, the handheld music player 200 may comprise a processor 202 to control operations of the device, a display screen 204, such as, for example, a Liquid Crystal Display (LCD) screen and a file storage system 206. The file storage system 206 is typically a semiconductor flash memory device or a plurality of flash memory devices or a magnetic storage means as a hard disk driver. The file storage system may also include a cache to improve the data access time. The mobile device 200 further comprises a user input device or devices 208 as keys, touch pads or a rotational user interface as used in iPod from Apple Inc. The user input device can be integrated at least partially with the display screen in a specific implementation related to touch-screen type of display. A touch-screen is a display which can detect the location of touches within display area, usually performed either with the human hand or a stylus. The device 200 also includes a speaker system 210 and a power supply 212 such as a battery.

A software module "advertisement message manager" 214 is used to control the operations for rendering advertisement messages to the display screen 204. The device being characterized in that, the software module is arranged to identify the status of the media player and deliver advertising messages accordingly. Another software module "storage capacity manager" is used to manager the storage system of the device. The device is characterized in that the un-used storage space is utilized to store recommended unpaid media assets from the on-line merchandiser. The storage capacity used by such "hidden" files can be used by the user anytime he or she needs the capacity. The operation is transparent to the user.

Basic operation of a media player (music player) is described as follows. A portable media player comprises a processor and a file storage system that is typically a flash memory or a plurality of flash memories. It further comprises user interface unit such as a Liquid Crystal Display (LCD) screen and a user input device such as a rotational user input device used in an iPod from Apple. The file system stores media assets. A user selects an asset that he or she owns the right to play from the user interface. The processor receives the selection and controls the operation of sending the selected media asset to coder/decoder (CODEC) for the signal processing to generate analog signal for further delivering to speakers for an audio experience in case of a music player. The media player has a data link for connecting to a computer. A battery, more particularly, a rechargeable battery is used to provide power for the player.

The media player includes a user input device that allows a user to interact with the device. For example, the user input device can take a variety of forms, such as a button, keypad, dial, etc. A rotational user interface as implemented by Apple Inc in an iPod has gained significant popularity. The rotational input device can be continuously actuated by a circular motion of the finger. The finger may rotate relative to an imaginary axis. In particularly, the finger can be rotated through 360 degree of rotation without stopping. This form of motion may produce continuous or incremental scrolling through the list of songs being displayed on the display screen.

Since a display screen associated with a handheld media player is typically small, an efficient user interface is required to allow a user intuitively navigate among, and select, songs to be played. The operation typically includes an overlapping hierarchy of categories. Categories include items that can also be included in other categories so that the categories overlap with each other. Thus, an asset title can be accessed in multiple different ways by starting with different categories. For example, the top-level categories "Album", "Artists", "Genres" and "Playlists" are presented to a user first. Within the Albums category are names of different albums of assets stored in the device. Within each album are album tracks, or songs, associated with that album. Similarly, the Artists category includes names of artists which are, in turn, associated with their albums and songs. The Genre category includes types of categories of music such as "Rock", "Classical", "Pop", etc. Within these sub-categories are found associated songs. Finally, the "Playlists" category includes collections of albums and/or songs which are typically defined by the user.

Figure 4:
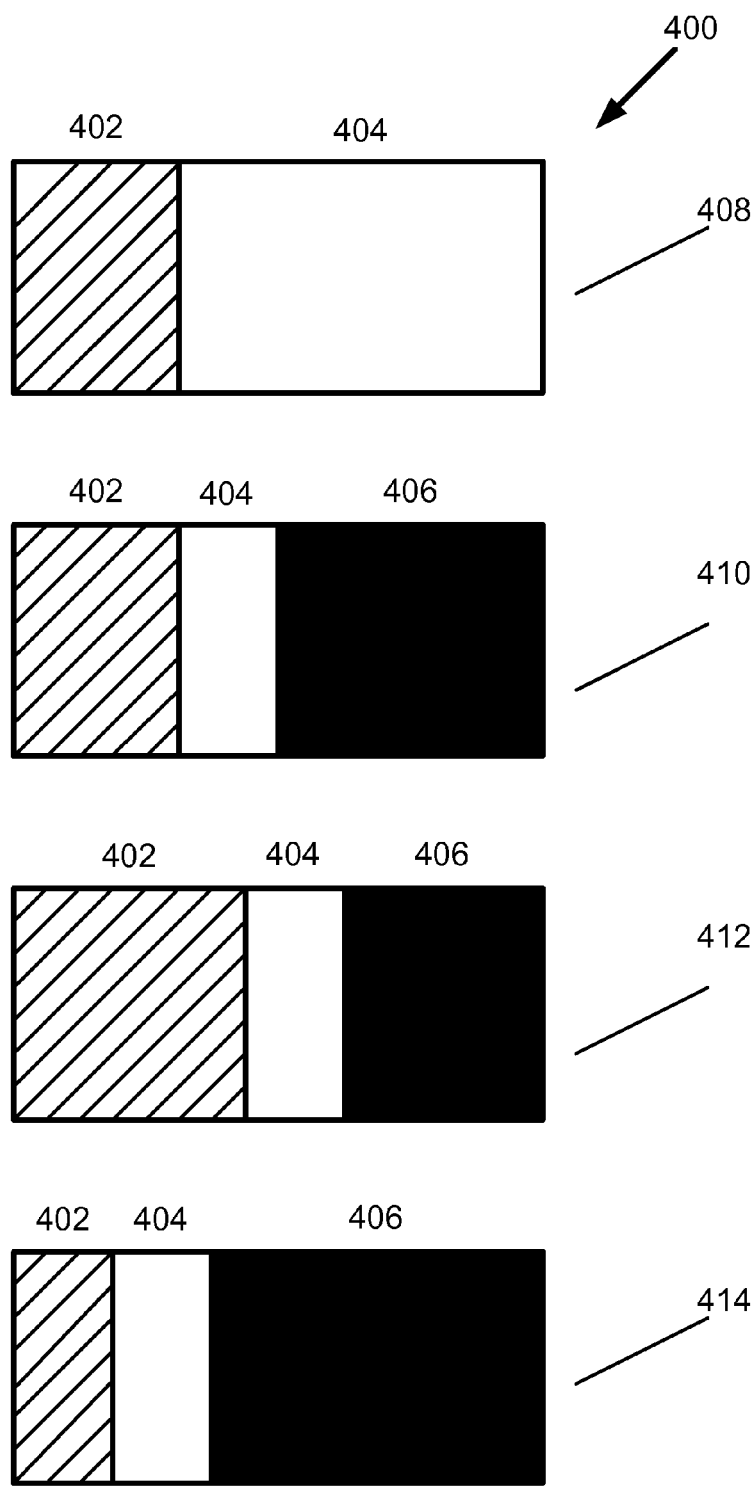
FIG. 4 is a diagram of a storage space for a media player divided into three zones for different applications.

FIG. 3 is a schematic diagram of the media file format including file data in the form of MP3 track, a metadata fields for holding data indicating the name of the album the track is from, the name of the song, the genre of the song and the type of the track. The data format further includes two additional fields. One is used to indicate a file status of 'visible' or 'hidden'. A media asset owned by the user has a status indicator of 'visible' that is visible to the user operating the media player in the sense of the conventional user interface. An unpaid media asset pushed by an on-line merchandiser to the media player has a status indicator "hidden", which is invisible to the user without additional intended interactions. Another added field is to indicate the priority of the stored media files. For the files with a status of 'visible', they have a default priority "1" without difference. For hidden media files, they are assigned a priority starting from "2" to whatever number it takes to rank all hidden files sequentially FIG. 4 is a diagram of a storage space of a media player divided into three zones for different applications. A storage system 400 includes a required storage space 402 and an unused storage space 404 as shown in 408. The required space 402 is used to store all media assets and other data owned by a user. The fact that a storage capacity is typically not fully utilized is known for most media players in the market. With increasing in flash memory density and reduction in price, more and more memory "bits" are to be placed into a media player. It is common that significant portion of storage capacity associated with media players is not used. The present invention is intended to use these wasted storage capacity more effectively. The most part of unused storage capacity 404 can be used to store unpaid media assets pushed from the on-line merchandiser in a form of hidden assets as indicated in the figure as the zone-hidden 406. A storage system of a media player thus can be divided into three zones as shown in 410. The zone-user 402 is used to store all media assets and other data owned by the user. The zone-buffer 404 is an unused buffered space between the zone-user 402 the zone-hidden 406 that is used to store all media assets from the merchandiser as hidden assets. The data files stored in zone-user 402 have higher priority than the files stored in zone-hidden 406. As it was described previously, each file has a field indicating its visibility. If a user requires more storage space for media assets own by the user or for other data files, the zone-user capacity expands automatically while the capacity for zone-hidden is reduced accordingly as shown in 412. Another field indicating the priority for each asset can be used to remove the lowest priority file repeatedly in a sequential manner to give space to the zone-user. The operation is controlled by the processor in the media player. On the other hand, as shown in 414 an opportunity can be taken for the on-line merchandiser to add more assets to the zone-hidden if the user required storage space is reduced.

Figure 5:
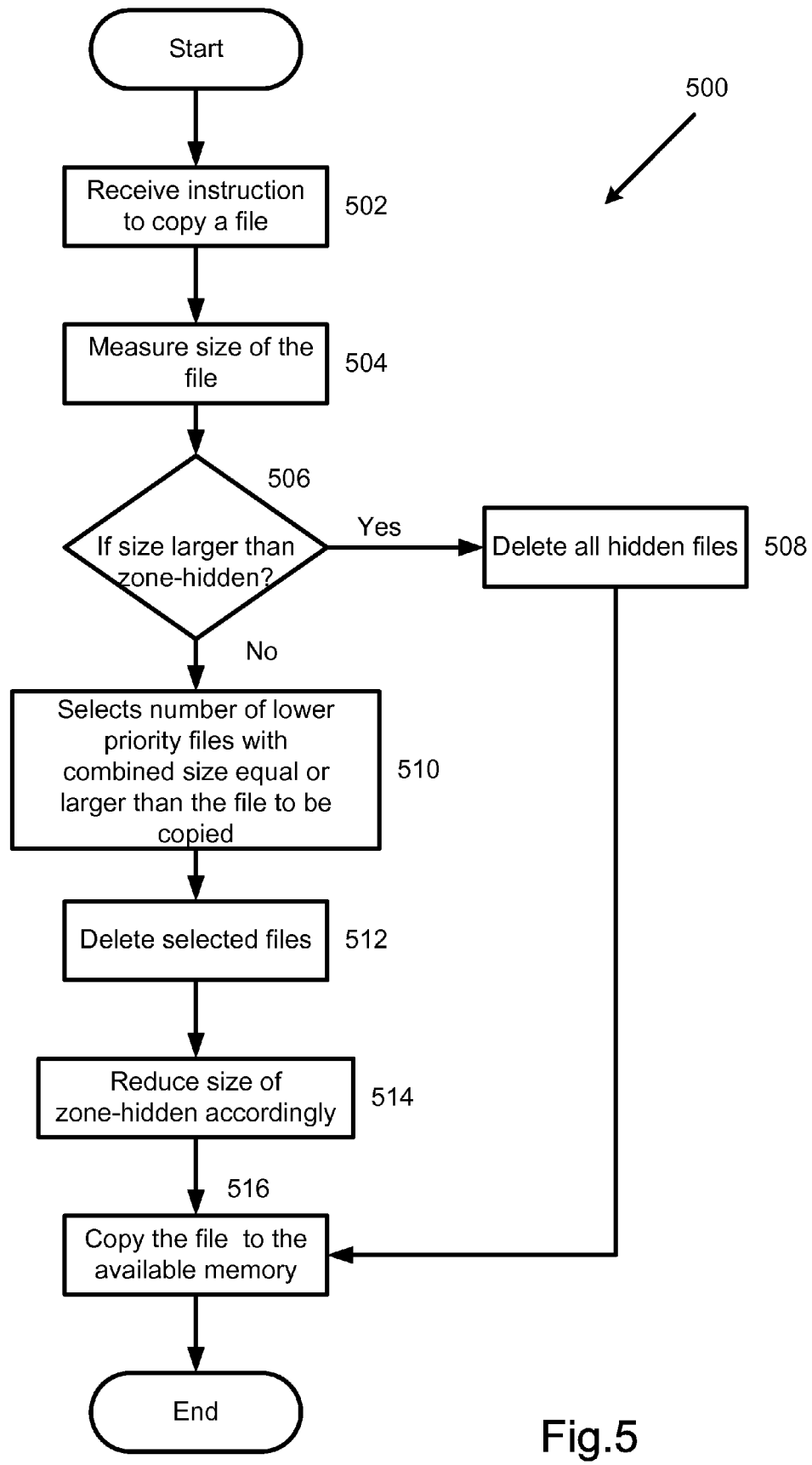
FIG. 5 is a flow diagram of depicting steps for copying a file into the storage system of a media player with the presence of the hidden files.

FIG. 5 is a flow diagram of depicting steps for copying a file into the storage system of a media player with the presence of the hidden files. The process 500 starts by a step 502 of receiving a user's instruction to copy a file from an external device to the media player. The external device includes a general purpose computing device such as a computer. The file can be a media asset that the user owns the right to use or a data file. The processor in the media player measures the size of the file (504). In a step 506, the size of the file is compared with the capacity of the zone-hidden. If the file size is larger than that of the zone-hidden, all hidden files are removed (508). Otherwise, a number of lower priority files in zone-hidden are selected, which are with a combined size at least equal to the size of the file to be copied (510). All selected files are then deleted under the control of the processor in the media player (512). The zone-hidden capacity is then reduced accordingly (514). In a step 516, the file is copied into the storage system of the media player with a result that zone-hidden is eliminated or the size of it is reduced. It should be noted that the operation is transparent to the user, who does not feel any impact that the part of the storage system is used to store the hidden files pushed from the on-line merchandiser.

Figure 6:
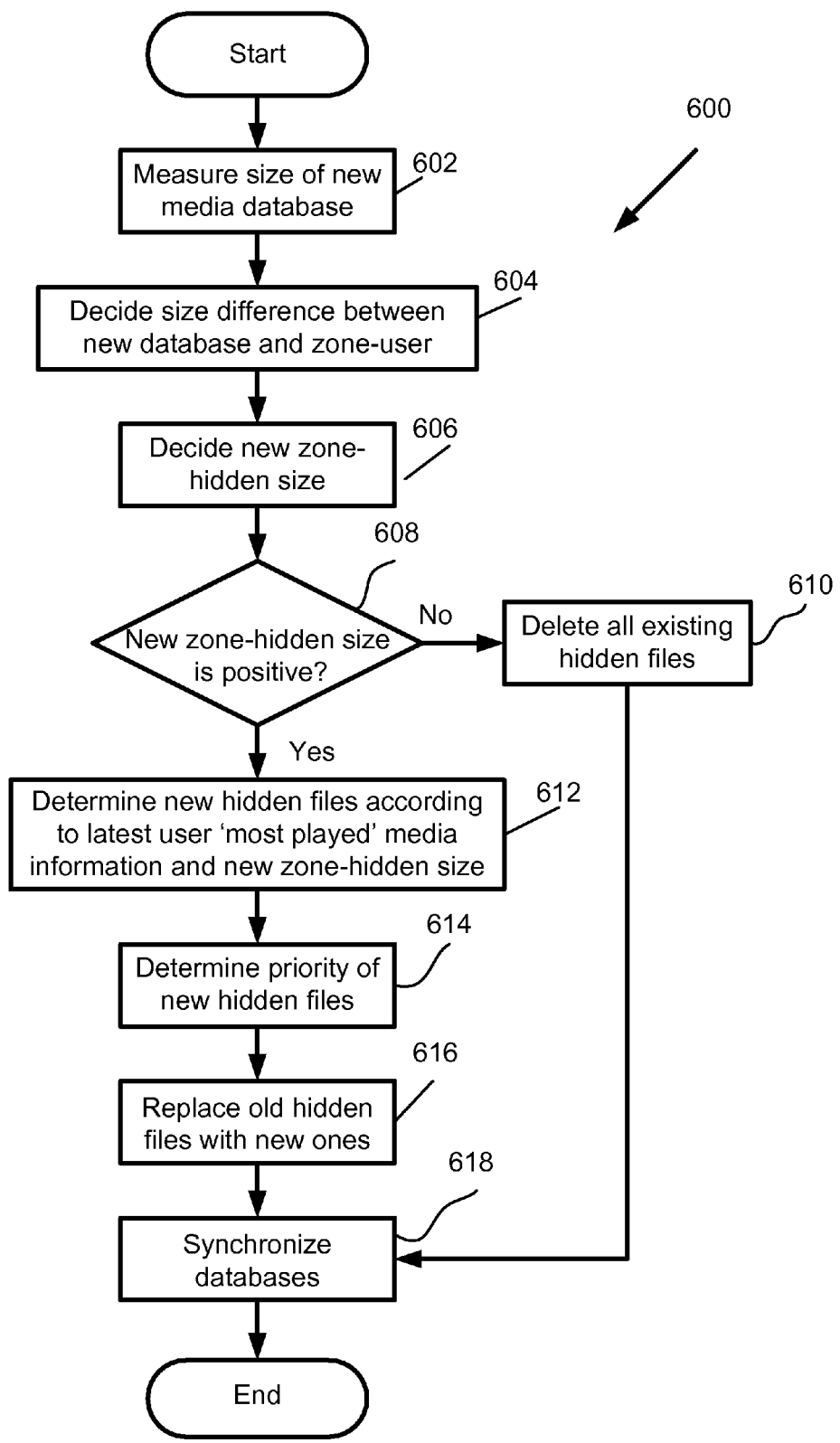
FIG. 6 is a flow diagram of depicting steps for synchronization of the media database of a media player with the one in a computer, wherein the computer is linked to an on-line merchandiser that pushes hidden media assets to an available storage space in the media player.

FIG. 6 is a flow diagram of depicting steps for synchronization of the media database of a media player with the one in a computer. The computer is connected to the server operated by the on-line merchandiser through the Internet. The process 600 starts by a step 602 of measuring the size of the new media database in the media server. The size difference between the new and the existing database occupying zone-user in the media player is determined in a step 604. The updated zone-user capacity based upon the calculated difference can be decided. The zone-hidden capacity available for the media assets from the merchandiser can then be updated in the step 606. In a step 608, it is verified if zone-hidden capacity is available. In an extreme case, all media assets in the zone hidden are removed if the new media database is sufficiently large and the zone-hidden of the storage space needs to give all its capacity to the new media database in a step 610. If the zone-hidden has available storage space after taking into consideration of the new media database, a new list of media assets is determined by the on-line merchandiser based upon the user's media database. The new set of the media assets to be pushed to the user's media assets is then delivered via the computer by the use of the Internet. In a more specific implementation, the list can be determined based upon a recorded history of the list of the "most played artists" as indicated by the step 612. In the step 614, the priority of each file is assigned accordingly. The existing hidden assets are replaced by new ones in the media player in a conventional way in a step 616. The last step 618 completes the synchronization of the media file database in the media player with the one in the media server. A synchronization process typically takes a significant amount of time. The process can be started as soon as the media player is hooked up with the computer.

Figure 7:
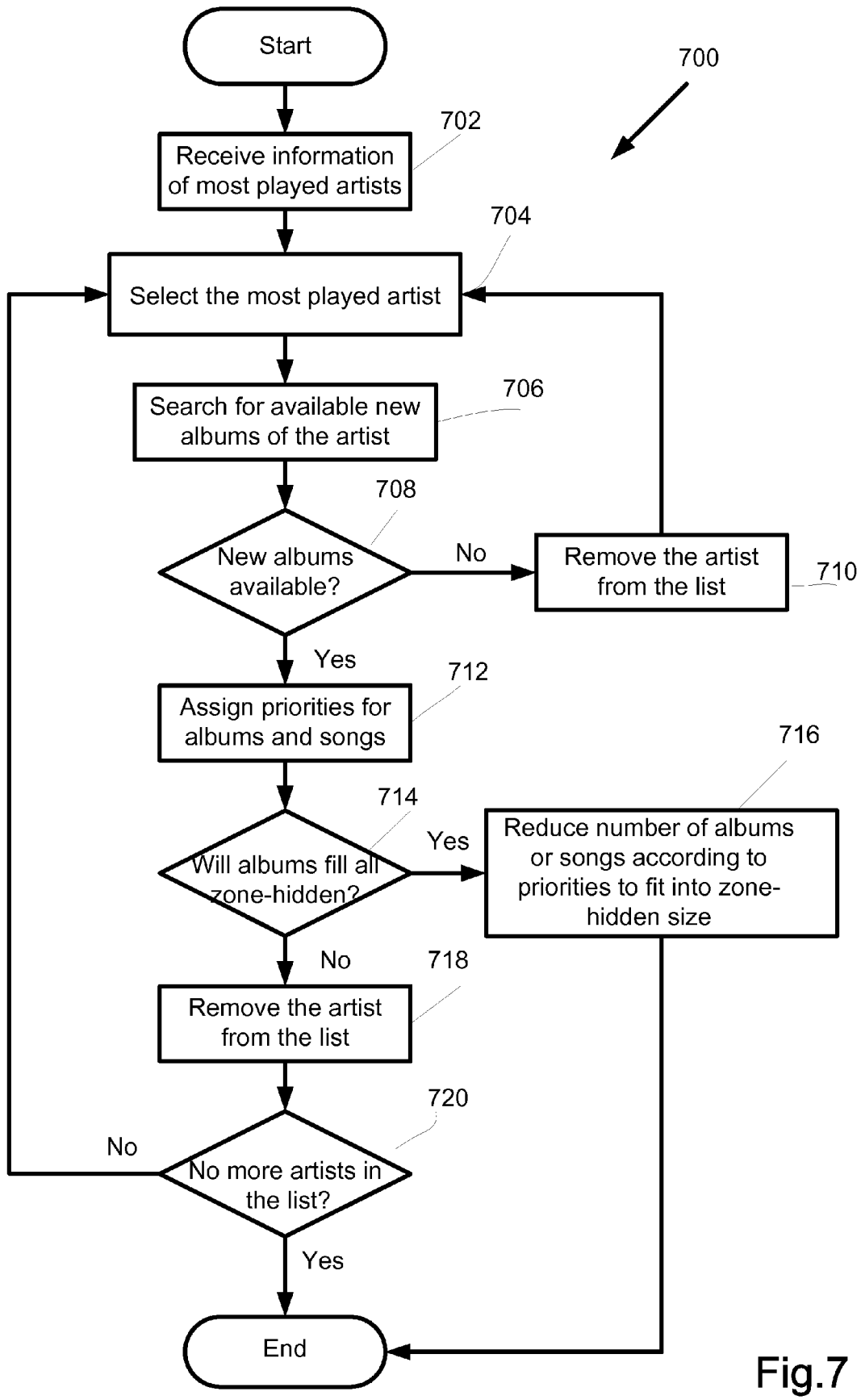
FIG. 7 is a flow diagram of depicting steps for selecting media assets to be pushed to a media player and for setting priorities for the files.

FIG. 7 is a flow diagram of depicting steps for selecting media assets to be pushed to a media player and for setting priorities for the files. The process 700 starts with receiving latest information by the on-line merchandiser about the "most played artists" from the media player hooked up with a computer in a step 702. A user management program from the on-line merchandiser then selects the most played artist in a step 704 and searches for available albums that have not been included in user's media database in a step 706. If the additional albums are not available from the merchandiser's database (708), the artist name is removed from the list in a step 710 and the new most played artist is selected which is the next one in the list. Otherwise, the albums are selected and priorities are assigned to the songs in the albums in a step 712. The user management program then decides if the selected albums and songs will use up zone-hidden capacity of the media player (714). If the reviewing result is positive, the number of albums and songs are reduced according to priorities to fit the zone-hidden capacity (716). If the review result is negative, all the album and songs are kept in the list and the artist name is removed (718). The next most played artist is selected if there is any artist name is remained in the list and the process is repeated till either the zone-hidden capacity is used up or there are no more artists in the list. It should be noted that many variation could exist to select the media assets to be pushed to a user. For example, the list can be determined based upon the most recently played media assets. The assets can also be decided by selecting artists closely related to the artists in the most played artist list. Furthermore, the assets can be selected based on genre of the songs the user played. It can also be a strategy with a combination of several or all the above methods.

Figure 8:
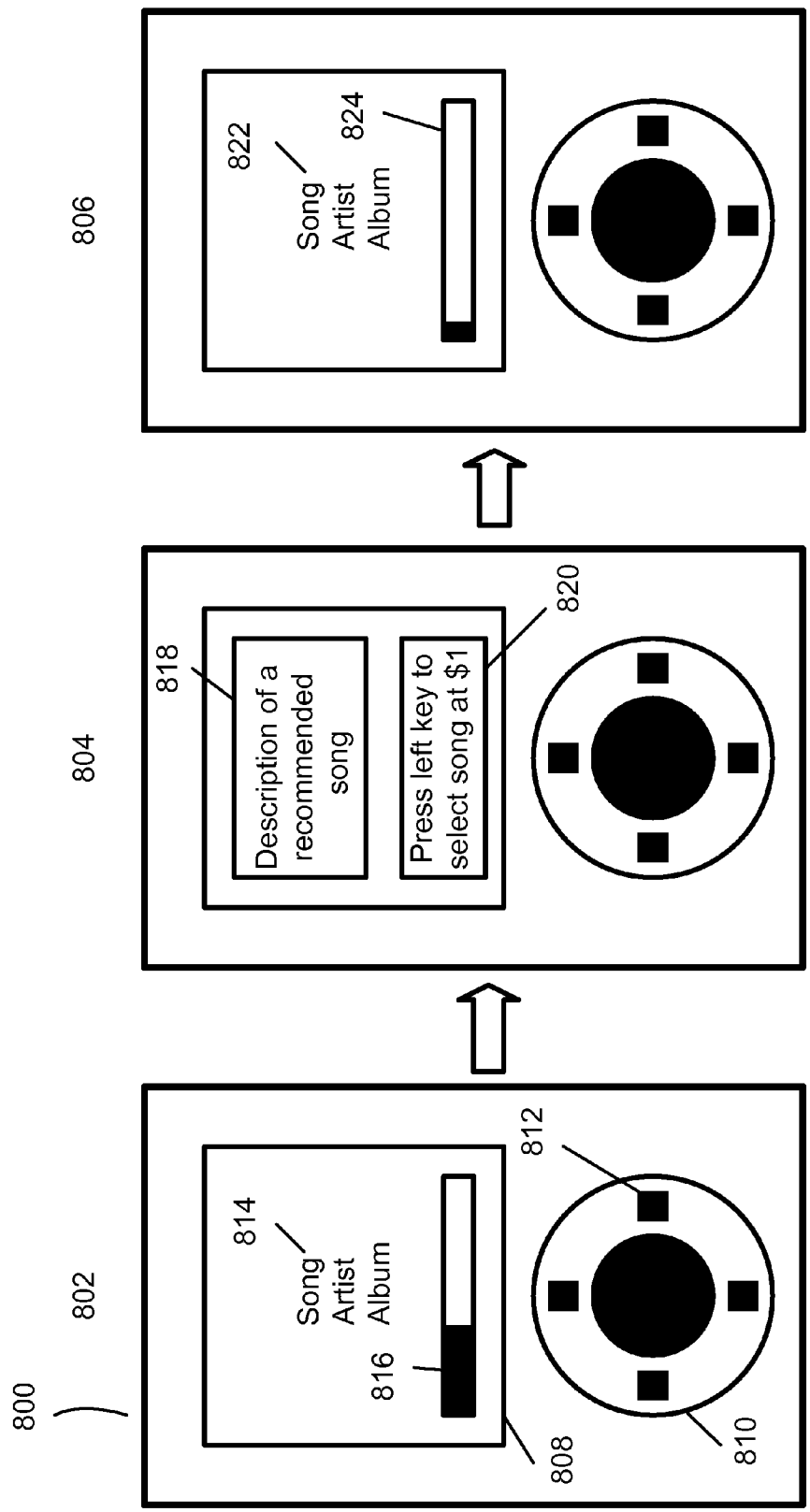
FIG. 8 is a schematic diagram of a series of display screens showing the changes from a default screen for a media player when a paid asset is being played to a screen that the advertising message including metadata for a unpaid asset is displayed and to a screen that the recommended asset is paid and played.

FIG. 8 is a schematic diagram of a series of display screens showing the changes from a default screen 802 for a media player when a paid asset is being played to a screen 804 that advertising message including metadata for an unpaid asset is displayed and to another screen 806 that the recommended asset is paid and played. The handheld media player 800 includes a display screen 808, a rotational user input device 810 with several input keys 812 located along the rotational user interface 810. When a paid asset is being played, the associated metadata 814 of the asset is displayed. The screen typically includes a horizontal visual symbol indicating the progress of the operation of playing the asset. After a predetermined period of time, an idle screen with the time of day is typically displayed. In the present invention, a screen 804 is displayed with advertising messages 818 of a selected unpaid media asset. According to the present embodiment, the advertising message describes an asset which typically includes metadata of the asset such as for example, the author, the artist and the style of the song. Another message 820 that describes the way the user can select the asset for paying and playing is displayed concurrently. The price of the asset is listed in the figure as an exemplary illustration. Different commercial schemes can be designed such as for example, paid per consumption or paid for usage forever. After receiving the user's selection, the process terminates the operation of the playing of the current asset and starts to play the asset advertised. The standard screen for playing an asset is then shown in 806 including metadata of the asset 822 and the horizontal visual symbol 824.

Figure 9:
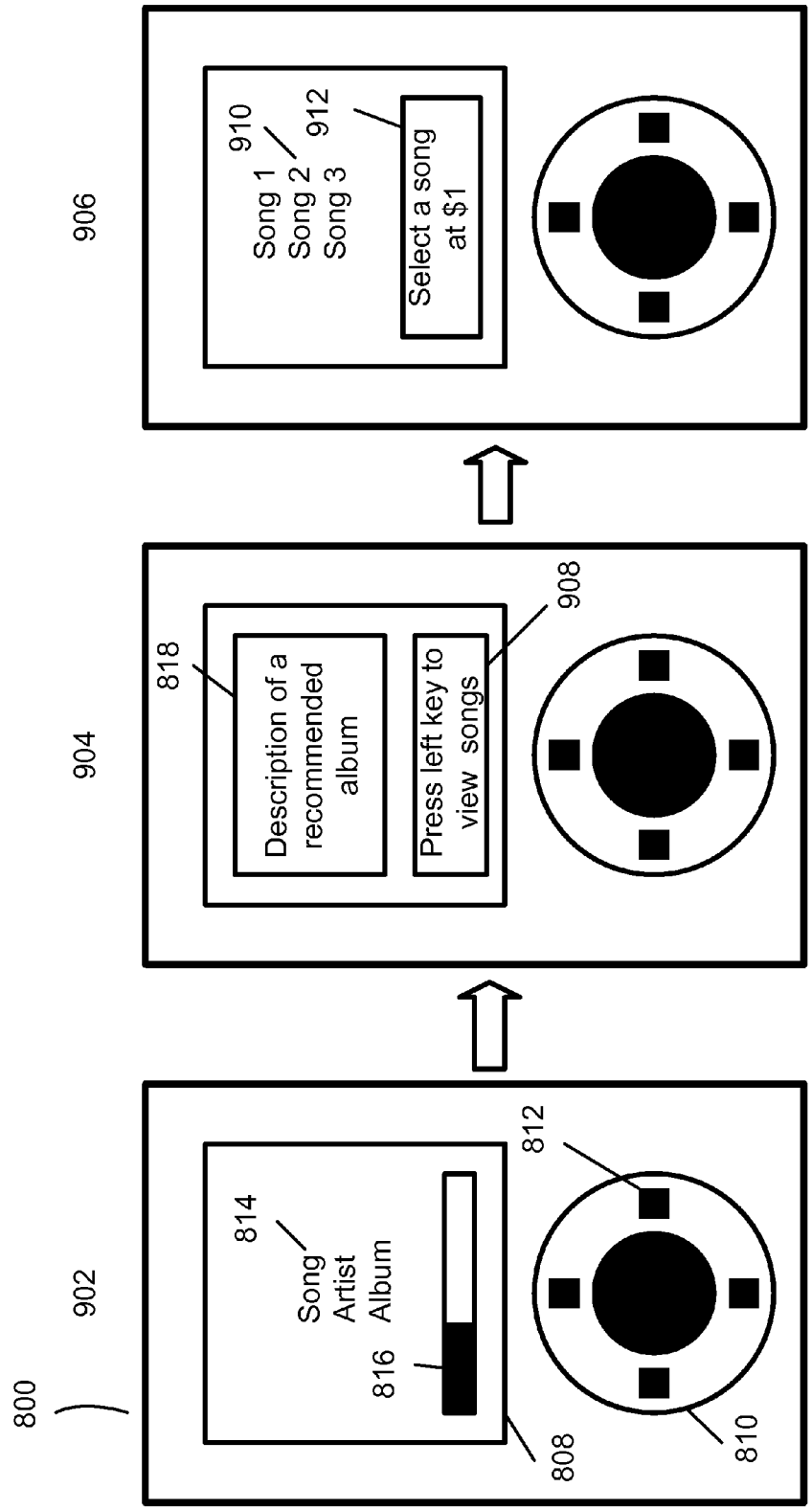
FIG. 9 is a schematic diagram of a series of display screens showing the changes from a default screen for a media player when a paid asset is being played to a screen that advertising message for an album is displayed and to a screen that metadata of a plurality of assets are displayed.

FIG. 9 is a schematic diagram describing a variation of the above embodiment. When a paid asset is being played, a default screen 902 is displayed. An advertising message for an album rather than the specific asset (song) is displayed as shown in 904 after a predetermined period of time. If the user selects the advertising asset for paying and playing, a display screen is shown in 906 with a plurality of selectable assets (songs). The user may make a further selection of the listed assets.

Figure 10:
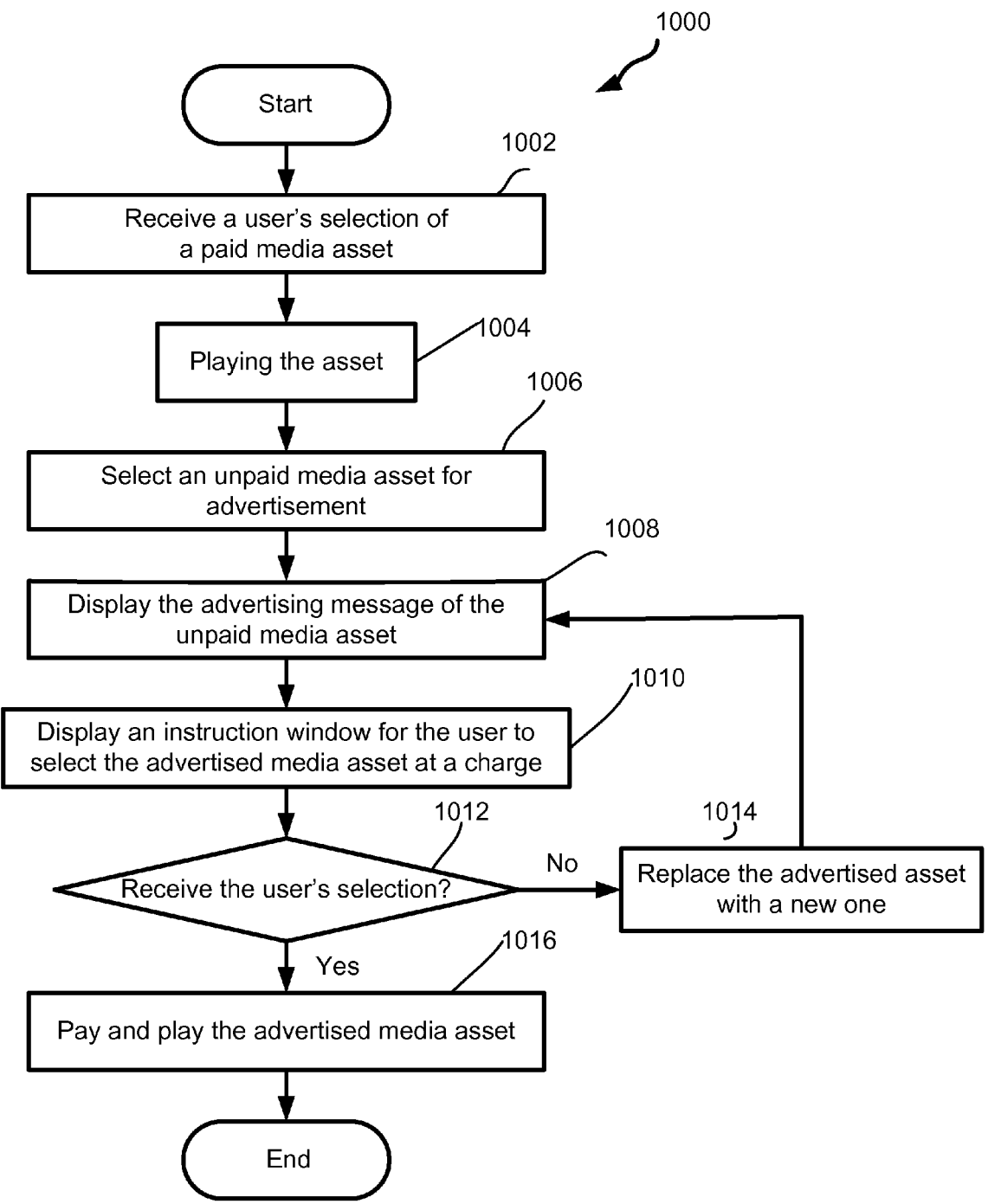
FIG. 10 is a flow diagram of depicting steps for rendering a recommended unpaid media asset to the user by the use of the idle screen when a paid asset is being played.

FIG. 10 is a flow diagram of depicting steps for rendering a recommended unpaid media asset to the user by the use of the idle screen when a paid asset is being played. The process 1000 starts with a step 1002 that the user selects an asset and the media player executes the operation of playing the asset in a step 1004. The processor of the media player controls a step 1006 to select an asset to be advertised based upon the one is being played. For example, the selected asset may be a song from another album of the same artist. Advertising message for the asset related to the paid asset being played is then displayed on the idle screen in a step 1008. The displayed message may include metadata of the unpaid asset or other introductory messages about the asset. An instruction window with messages guiding the user to select the asset for playing and commercial information about the purchasing of the asset is displayed on the screen concurrently in a step 1010. If the user does not select the advertised asset for playing in a step 1012, the advertising message may be replaced by another advertising message representing another recommended asset in a step 1014. Otherwise, the asset is selected and is paid and played in a step 1016.

Figure 11:
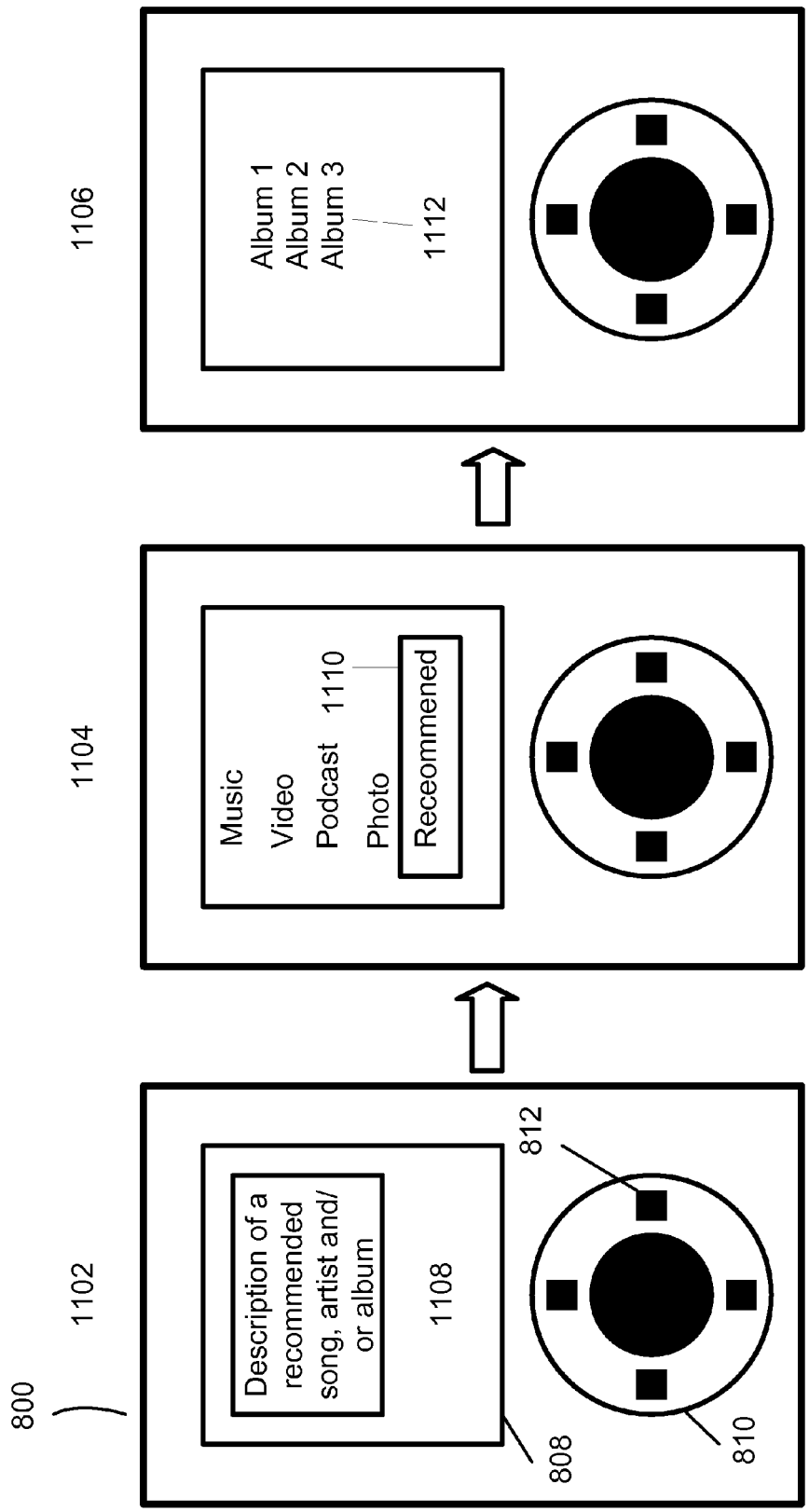
FIG. 11 is a schematic diagram of a series of display screens showing the changes from a screen with advertising message for a media player when the device is switched on to a screen that the first lever of user interface is displayed to a sub-category that includes a plurality of recommended albums.

FIG. 11 illustrates another embodiment of the present invention by the use of the switching-on screen of a media player to render an advertising message of an unpaid asset (song) to the user. As shown in 1102, an advertising message 1108 is displayed when the media player is switched on by the user. The message may include metadata of an unpaid asset (song) or other introductory messages. The user may decide to select the advertised asset for paying and playing or may decide to ignore the message. The first level of the user interface with a plurality of sub-categories is displayed on the screen as shown in 1104 including a sub-category 1110 for recommended assets from the on-line merchandiser. The user may decide to view the sub-category as shown in 1106 with a displayed multiple albums 1112.

Figure 12:
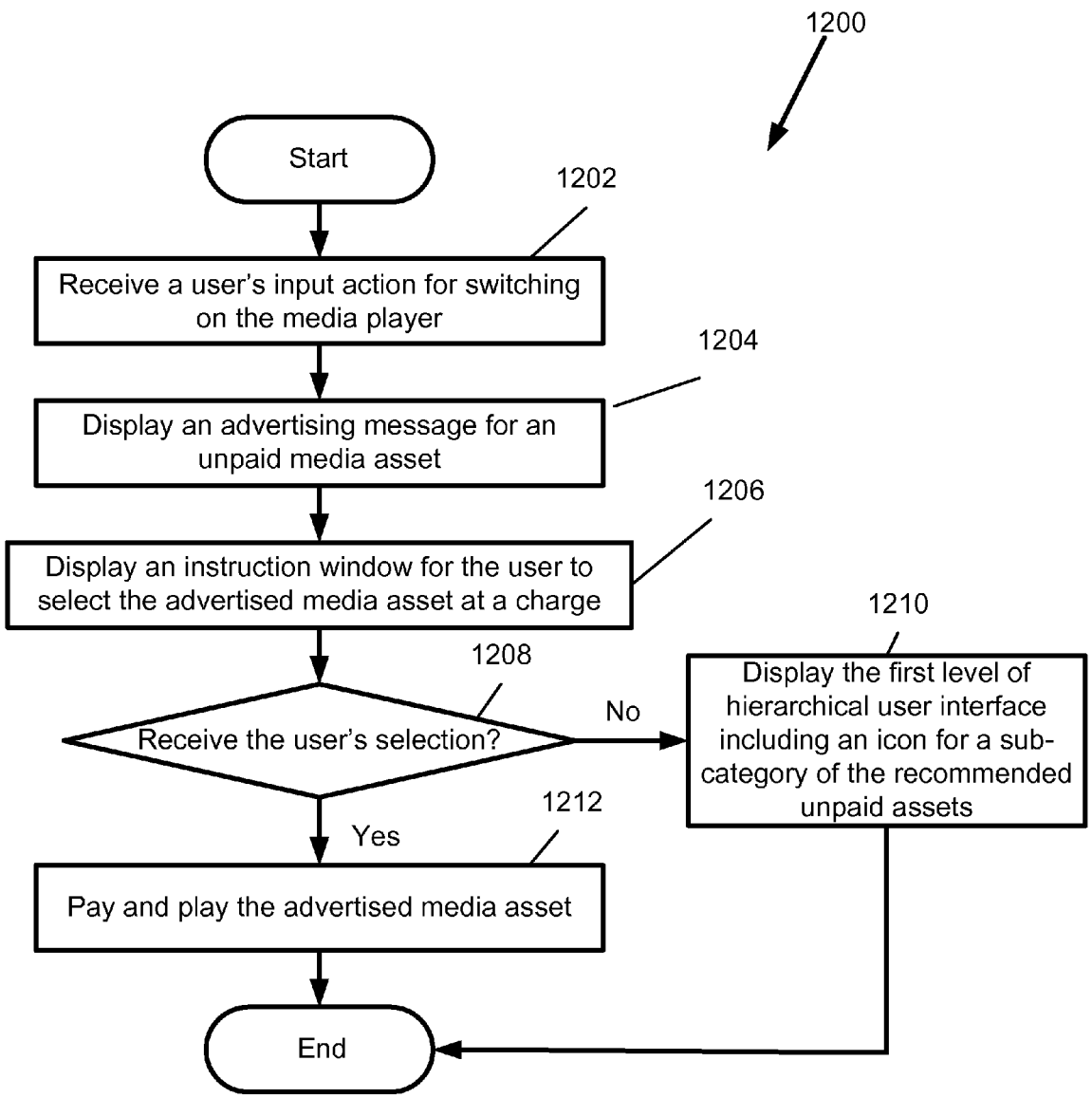
FIG. 12 is a flow diagram of depicting steps for rendering a recommended unpaid media asset to the user by the use of the switching-on screen.

FIG. 12 is a flow diagram of depicting steps for rendering a recommended media asset to the user by the use of the switching-on screen. The process 1200 starts with a step 1202 of switching on the media player by the user. An advertising message for a media asset is then displayed on the switching-on screen in a step 1204. An instruction window guiding the user to select the advertised asset for playing and the related commercial information with regard to the price is displayed concurrently in a step 1206. In a step 1208, if the advertised asset is not selected by the user, the first level user interface will be displayed in a step 1210 including a sub-category for recommended unpaid assets. If the user selects the asset for playing in the step 1208, the asset may be played in the following step 1212.

It should be noted that all above mentioned embodiments assume that the handheld media players are connected to the server through computers via interne. The present invention can be easily extended to embodiments that the media players are directly connectable to a server operated by the on-line merchandiser through a communication network such as the Internet. In such an implementation, the payment to the merchandiser may be carried out in a real time base through the Internet. Furthermore, at least a portion of recommended unpaid media assets may be stored in the server. Metadata's associated with the assets stored in the server are still stored in the player. When the metadata associated with an asset is selected through the means described in the invention, the asset stored in the server may be delivered to the user's handheld device from a server in a real time means.

The invention claimed is:

1. A method of rendering at least one unpaid media asset by a processor of a media player to a user from a plurality of unpaid assets stored in available storage capacity of the media player, the method comprising:
   a. displaying metadata of the unpaid asset on an idle display screen of the media player while a paid media asset is being played;
   b. selecting said unpaid asset and paying for said asset if the user's input actions are received within a predetermined period of time; and
   c. erasing the displayed metadata of the unpaid asset if the user's input actions are not received within a predetermined period of time,
   wherein a storage capacity manager is employed to determine said available storage capacity by subtracting from total storage capacity of the media player: a) a storage capacity that has been used for operations of the media player; and b) a predetermined buffered storage capacity,
   wherein said paid and unpaid media asset further comprising two additional fields for media metadata including a first field indicating visibility of the media asset on the display screen by a predetermined hierarchical user interface; and a second field indicating priority in a sequential manner with regard to the use of said available storage capacity,
   wherein said available storage capacity may be fully utilized to store said unpaid media assets,
   wherein said unpaid media assets may only be accessible by the user through said steps "a" and "b".

2. The method as recited in claim 1, wherein said media asset ranked with lowest priority with regard to the use of said available storage capacity in said sequential manner may be deleted automatically in a repeated manner to fit remaining unpaid media assets to the available storage capacity if said available storage capacity is reduced.

3. The method as recited in claim 1, wherein said method further comprising of replacing the displayed metadata of the unpaid asset by new metadata for a new unpaid asset after a predetermined period of time if the user's input actions are not received.

4. The method as recited in claim 1, wherein said displayed unpaid media asset is related to the paid media asset being played.

5. A method of rendering at least one unpaid media asset by a processor of a media player to a user from a plurality of unpaid assets stored in available storage capacity of the media player, the method comprising:
   a. displaying metadata of the unpaid media asset on a first display screen of the media player immediately after the media player is switched on;
   b. selecting said unpaid asset and paying for said asset if the user's input actions are received within a predetermined period of time; and
   c. displaying a first level of user interface with a subcategory including unpaid media assets if the user's input actions are not received within a predetermined period of time,
   wherein a storage capacity manager is employed to determine said available storage capacity by subtracting from total storage capacity of the media player: a) a storage capacity that has been used for operations of the media player; and b) a predetermined buffered storage capacity,
   wherein said paid and unpaid media asset further comprising two additional fields for media metadata including a first field indicating visibility of the media asset on the display screen by a predetermined hierarchical user interface; and a second field indicating priority in a sequential manner with regard to the use of said available storage capacity,
   wherein said available storage capacity may be fully utilized to store said unpaid media assets,
   wherein said unpaid media assets may only be accessible by the user through said steps "a", "b" and "c".

6. The method as recited in claim 5, wherein said media asset ranked with lowest priority with regard to the use of said available storage capacity in said sequential manner may be deleted automatically in a repeated manner to fit remaining unpaid media assets to the available storage capacity if said available storage capacity is reduced.

7. The method as recited in claim 5, wherein said method further comprising of replacing the displayed metadata of the unpaid asset by new metadata for a new unpaid asset after a predetermined period of time if the user's input actions are not received.

8. A method of managing a file storage system by a storage capacity manager in a media player including a processor, comprising:
   a. determining by the storage capacity manager controlled by the processor available storage capacity by subtracting from total storage capacity of the media player: a) a storage capacity that has been used for operations of the media player; and b) a predetermined buffered storage capacity;
   b. storing by the storage capacity manager controlled by the processor unpaid media assets in said available storage capacity, wherein each unpaid asset is ranked with a priority in a sequential manner with regard to the use of said available storage capacity; and
   c. deleting by the storage capacity manager controlled by the processor the processor lowest priority unpaid asset automatically in a repeated manner to fit remaining (undeleted) unpaid assets to the available storage capacity if said available storage capacity is reduced,
   wherein said unpaid assets are delivered to the media player by a method including:
   a. transferring the assets from an on-line merchandiser to the media player through a general purpose computing device; and
   b. transferring the assets from the on-line merchandiser to the media player directly when the player is with a wireless communication device.

9. The method as recited in claim 8, wherein said method further comprising:
   a. storing by the processor more unpaid media assets if said available storage capacity is increased; and
   b. re-ranking by the processor priorities for each unpaid media asset.

10. The method as recited in claim 8, wherein said priority is determined by the processor based upon a specific media asset database of a user.

11. The method as recited in claim 8, wherein said priority is determined by the processor based upon the most played artist list by a user.

* * * * *